Jan. 20, 1970         Z. POSAVEC         3,490,168
FLOATING FISHHOOK HOLDER
Filed April 10, 1967                2 Sheets-Sheet 1
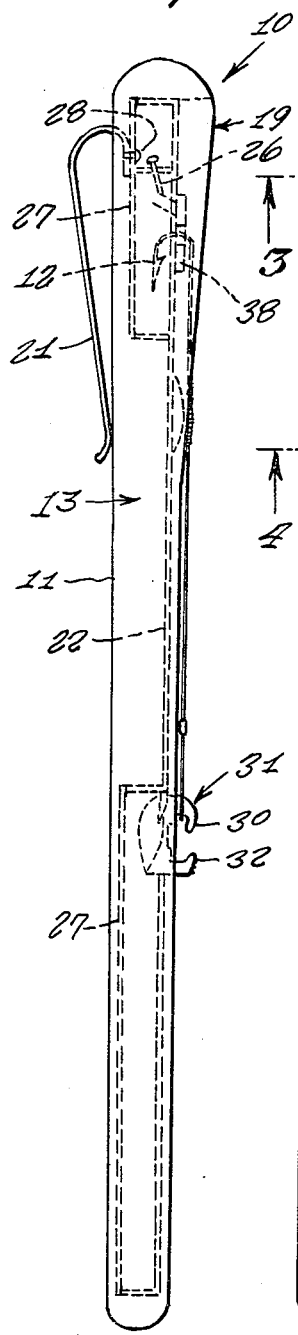
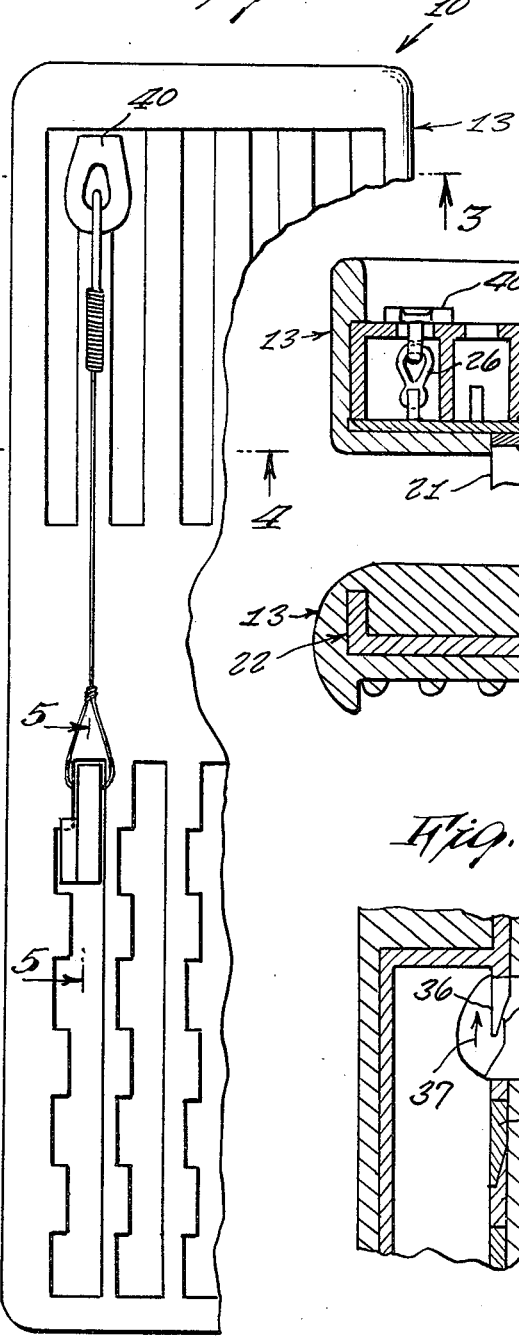
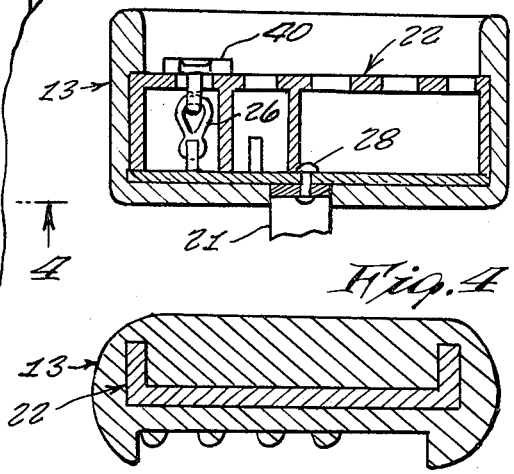
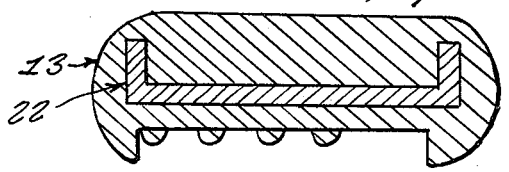
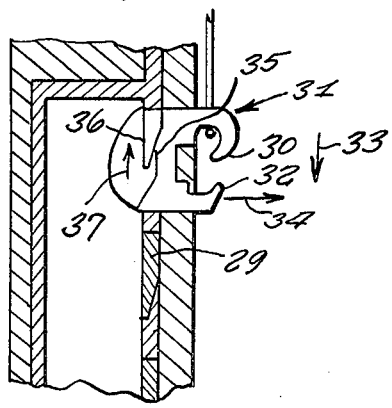
INVENTOR
ZVONIMIR POSAVEC

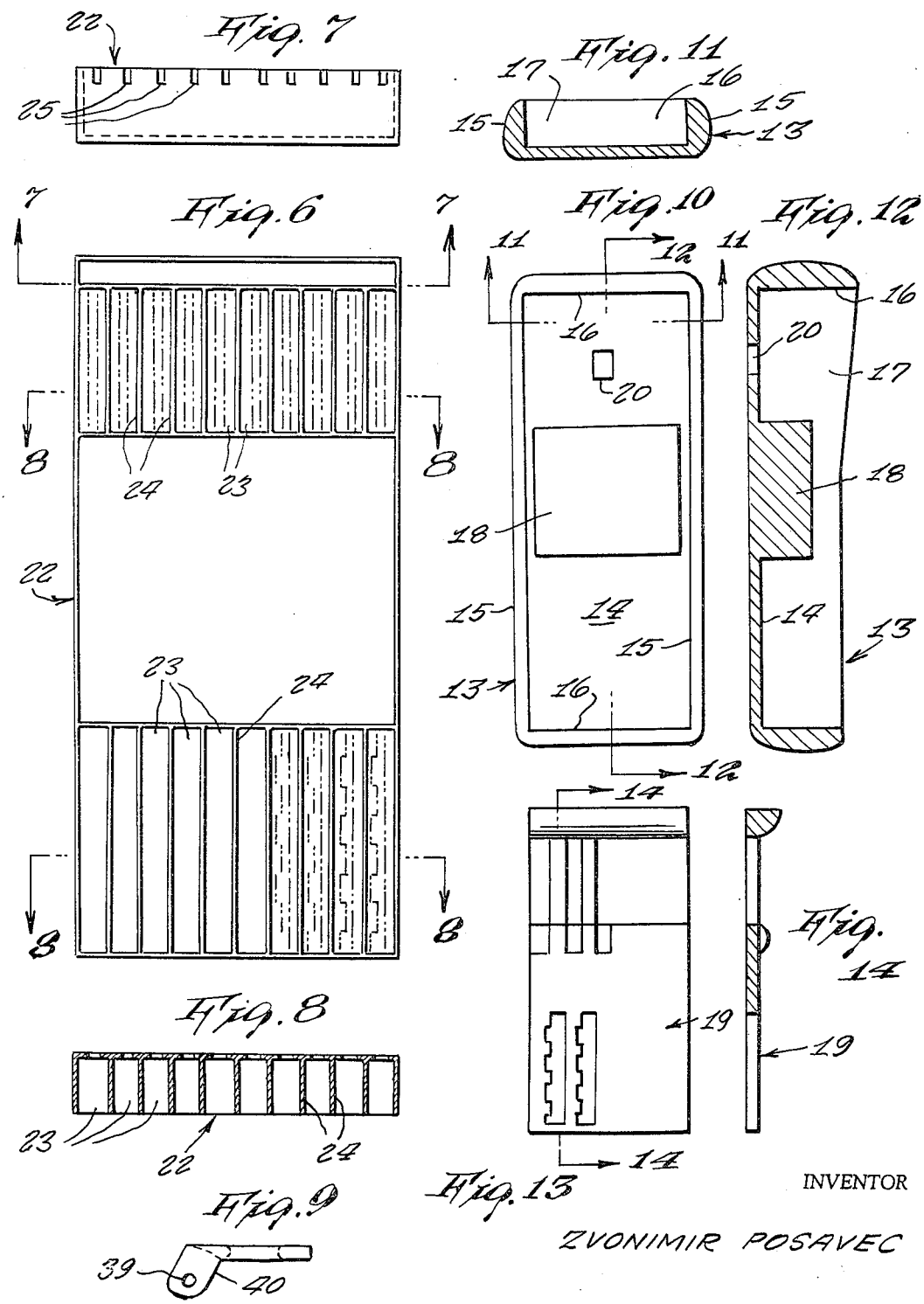

United States Patent Office 3,490,168
Patented Jan. 20, 1970

3,490,168
FLOATING FISHHOOK HOLDER
Zvonimir Posavec, 4 Jersey Ave., Brampton,
Ontario, Canada
Filed Apr. 10, 1967, Ser. No. 629,694
Int. Cl. A01k 97/06
U.S. Cl. 43—57.5          6 Claims

ABSTRACT OF THE DISCLOSURE

A holder for fishing hooks which may be floated upon the surface of the water and which includes a Styrofoam or cork lining, the lining encasing a body formed of hard plastic, the body including hook and snell retaining body covers, a snell retaining brake and protection tooth which forms a part of the body, a hook retaining eyelet made of plastic, and eyelet adjustment line of elastic, a plastic snell holder and a belt hanger hook made either of plastic or steel.

This invention relates generally to fishing hook holders.

A principal object of the present invention is to provide a floating fishing hook holder wherein the holder will float upon the surface of the water and which will fully protect a fisherman from losing the hooks when in the water.

Another object of the present invention is to provide a floating fishing hook holder having self-contained means so that it may be supported by being hooked to a belt or to an edge of a pocket as preferred.

Yet another object of the present invention is to provide a floating fishing hook holder which may incorporate button eyelets for purpose of supporting the same from a belt of a person or a pocket.

Yet another object of the present invention is to provide a floating fishing hook holder having adjustable hook retaining means and snell retaining means so as to accept different lengths of the hooks and keeping the leader lines thereof straight at all times.

Accordingly the present hook holder may hold 10 different sizes of hooks with different lengths of leader lines or all of them may be of the same size.

Other objects of the present invention are to provide a floating fishing hook holder which is simple in design, inexpensive to manufacture, ruggged in construction, easy to use and efficient in operation.

These and other objects of the present invention will be readily evident upon a study of following specifications and the accompanying drawings wherein;

FIGURE 1 is a side elevation view of a floating fishing hook holder incorporating the present invention, FIGURE 2 is a front elevation view thereof, FIGURE 3 is a cross-sectional view taken on the line 3—3 of FIGURE 2, FIGURE 4 is a cross-sectional view taken along the line 4—4 of FIGURE 2, FIGURE 5 is a cross-section view taken along the line 5—5 of FIGURE 2, FIGURE 6 is a front elevation view of the body of the floating fishing hook holder, FIGURE 7 is a view taken on the lines 7—7 of FIGURE 6, FIGURE 8 is a cross-sectional view taken along the lines 8—8 of FIGURES 6 in both instances, FIGURE 9 is a side-elevation view of an eyelet shown in FIGURES 1 and 2, FIGURE 10 is a front elevation view of a body lining which forms a part of the present invention, FIGURE 11 is a cross-section view taken along the line 11 of FIGURE 10, FIGURE 12 is a cross-sectional view taken along the line 12—12 of FIGURE 10, FIGURE 13 is a front elevation view of a body lining cover which forms a part of the present invention, FIGURE 14 is a cross-sectional view taken along the lines of 14—14 of FIGURE 13.

Referring now to the drawings in detail, the reference numeral 10 represents a floating fishing hook holder according to the present invention wherein there is a case 11 of generally flat configuration, and which is designed for purpose of retaining a plurality of hooks 12 each of which may be of a different size and having different lengths of leader lines.

The case is comprised from eight main parts, a first of which is a lining 13 made either of Styrofoam or cork so as to provide buoyancy to the device. The lining 13 is of configuration having a rear wall 14 opposite side walls 15 and opposite end walls 16 which define a central compartment 17 that is opened upon its front side. An integrally formed large block or mass of Styrofoam or cork forms a part of the present lining, as is clearly shown in FIGURES 10 and 12. A body lining cover 19, shown in FIGURES 13 and 14 is adapted to be fitted over the front opening of the lining 13, the body lining cover being likewise made from Styrofoam or cork material. An opening 20 in the lining member 13 is provided for receiving a belt hanger hook 21, shown in FIGURE 1 of the drawing.

The present construction further includes a body 22 shown in detail in FIGURES 6, 7 and 8, the body being made from 1/32 inch thick hard plastic, the body being adaptable to be fitted into the compartment 17 of the lining 13. The body is of box-like configuration and which is opened on one side. The body 22 is provided with a plurality of hook and snell retaining pockets 23 separated by partitions 24. In FIGURE 7, the reference numeral 25 indicates where an eyelet adjustment line 26 has to be inserted. A body cover 27 is fitted over the body before the body is assembled into the lining of the present device. The hook and snell retaining body cover 27 is also provided with connection means comprising a rivet 28 inserted therethrough to which the belt hook hanger 21 is secured, as shown in FIGURE 1.

A snell retaining brake and protecting hook 29 is a part of the body 22 and serves the following function; when a fishing hook is placed into the hook retaining eyelet opening or pocket 23 and the snell is hooked on a holding hook 30 of a snell holder 31, the snell holder is then driven with the end of a finger or fingernail holding the point 32 into the direction of the arrow 33, shown in FIGURE 5 of the drawing, the same being lifted upwardly in the direction of the arrow 34 so to get the slot of the tooth 35 in level with the protecting tooth 36 and release them in the direction of the arrow 37 to be hanged on tooth 36. The same procedure could be used for releasing the fishing hook from the holder, however all the described operation above would have to be done in the opposite direction.

Th hook retaining eyelet, as shown at 38 is made of plastic and serves to hold a fishing hook 12 in the place of the hook retaining pocket 23 so as not to become mixed with other fishing hooks and so to further hold the sharp of the fishing hook always within the pocket of the body and protect a fisherman against any injury therefrom.

The eyelet adjustment line 26 is made from elastic and has an adjustable function to hold on the fishing hook line and retain the same in a straight tight condition. In order to assemble the eyelet adjustment line, the fisherman must use one end of the line, inserted through the opening 39 of the eyelet 40, shown in FIGURE 9 of the drawing, then bend the line 26 so to get both ends of the line even in length and then make a snare aproximately ⅝ of an inch from the opening 39, place the line into slot 25, shown in FIGURE 7, so to get the snare behind the wall in the hook retaining position.

The snell holder is made from plastic and serves to hold a snell of the fishing hook line.

The belt hanger hook 21 may be made either from plastic or from spring steel and is secured by means of the rivet 28 to the body cover 27. The belt hanger hook has the function to hold the floating fishing hook holder to the fisherman's belt or pocket as preferred.

In operative use, should the floating fishing hook holder 10 be dropped into the water it will of course remain float due to the relatively large size of the Styrofoam or cork lining and lining cover.

I claim:

1. In a floating fishhook holder, the combination of a lining enclosing a body, said lining comprising a lining case, a lining cover, said lining case and lining cover being made from floatable materials such as Styrofoam or cork, said body comprising a body case and a body cover, said body case and body cover being made from hard plastic, said body cover comprising a pair of hook and snell retaining covers, a snell retaining brake and protecting tooth, said snell retaining brake and protecting tooth comprising a portion of said body case, a hook retaining eyelet positioned in a slot provided on one end portion of the body case, and eyelet adjustment line attached to body case and the hook retaining eyelet, a snell holder positioned in a slot provided on the other end portion of the body case and a belt hanger hook, said belt hanger hook secured with a body cover of the case providing a means for supporting said floating fishhook holder from a fisherman's belt or pocket.

2. The combination as set forth in claim 1, wherein said lining case includes a rear wall, parallel side walls and end walls defining a central opening for receiving said body case and body cover.

3. The combination as set forth in claim 2, wherein body case comprises two groups of hook and snell retaining pockets in parallel relationship and spaced-apart by partitions therebetween.

4. The combination as set forth in claim 3, wherein said hook retaining eyelet includes an opening for receiving said eyelet adjustment line therethrough and said hook retaining eyelet further includes an opening for receiving said hook ends of a fishing hook for retaining the same within said pocket of said body case.

5. The combination as set forth in claim 4, wherein said eyelet adjustment line is made from elastic material a portion of said line being fited within said hook of said hook retaining eyelet, the ends of said eyelet adjustment line being brought evenly together to form a snare and placed within a slot of said body case.

6. The combination as set forth in claim 5, wherein said snell holder comprises a plastic member having a first hook to hold the end of a snell and a second hook for manual adjustment thereof.

References Cited

UNITED STATES PATENTS

| | | | |
|---|---|---|---|
| 337,593 | 3/1886 | Levison | 43—57.5 |
| 1,451,256 | 4/1923 | Gardner | 43—57.5 |
| 2,448,728 | 9/1948 | Omohundro | 43—57.5 |
| 2,493,344 | 1/1950 | Hamel | 43—57.5 |
| 2,770,064 | 11/1956 | Kelly | 43—57.5 |

HUGH R. CHAMBLEE, Primary Examiner